(12) United States Patent
Salameh

(10) Patent No.: US 9,951,665 B2
(45) Date of Patent: Apr. 24, 2018

(54) COVER MOUNTING UNIT

(75) Inventor: Ralf Salameh, Gondelsheim (DE)

(73) Assignee: Federal-Mogul Sealing Systems GmbH, Herdorf (DE)

( * ) Notice: Subject to any disclaimer, the term of this patent is extended or adjusted under 35 U.S.C. 154(b) by 55 days.

(21) Appl. No.: 13/393,126

(22) PCT Filed: May 10, 2010

(86) PCT No.: PCT/EP2010/056328
§ 371 (c)(1),
(2), (4) Date: Feb. 28, 2012

(87) PCT Pub. No.: WO2011/023425
PCT Pub. Date: Mar. 3, 2011

(65) Prior Publication Data
US 2012/0152201 A1 Jun. 21, 2012

(30) Foreign Application Priority Data
Aug. 31, 2009 (DE) .................. 10 2009 039 508

(51) Int. Cl.
| F02B 77/04 | (2006.01) |
| F01M 11/00 | (2006.01) |
| F16B 5/02 | (2006.01) |
| F16B 5/06 | (2006.01) |
| F16B 41/00 | (2006.01) |
| F16J 15/06 | (2006.01) |

(52) U.S. Cl.
CPC ....... *F01M 11/0004* (2013.01); *F16B 5/0208* (2013.01); *F16B 5/0642* (2013.01); *F16B 5/0664* (2013.01); *F16B 41/002* (2013.01); *F16J 15/061* (2013.01)

(58) Field of Classification Search
CPC .... F02B 77/13; F02M 35/02416; F02M 35/04
USPC .................. 123/198 E, 195 C; 277/593, 628
See application file for complete search history.

(56) References Cited

U.S. PATENT DOCUMENTS

| 3,724,150 | A | * | 4/1973 | Hudnall | .................. E04F 19/08 |
| | | | | | 174/486 |
| 4,027,644 | A | * | 6/1977 | Timour | ..................... 123/198 E |
| 4,867,461 | A | * | 9/1989 | Shimmell | ..................... 277/593 |
| 5,529,313 | A | * | 6/1996 | Malks | ........................... 277/598 |
| 5,673,920 | A | | 10/1997 | Mockenhaupt | |
| 6,003,878 | A | * | 12/1999 | Noble et al. | .................. 277/596 |
| 6,227,784 | B1 | * | 5/2001 | Antoine et al. | ............... 411/369 |
| 2004/0512253 | | | 3/2004 | Clemons | |
| 2007/0024010 | A1 | * | 2/2007 | Roberts | .................. F16J 15/127 |
| | | | | | 277/593 |

(Continued)

FOREIGN PATENT DOCUMENTS

WO    WO 206/089604 A2    8/2006

*Primary Examiner* — Lindsay Low
*Assistant Examiner* — Omar Morales
(74) *Attorney, Agent, or Firm* — Robert L. Stearns; Dickinson Wright, PLLC

(57) ABSTRACT

A cover assembly unit includes a thin-walled cover pan with a sealing flange, at least two screw holes in the sealing flange, at least one fixing opening, a fastening screw captively arranged in each screw hole; and a carrier frame gasket with a carrier, a gasket, which bears against the sealing flange, a screw passage for each screw hole, a fixing element for each fixing opening, and a centering body for the fastening screw in each screw passage.

14 Claims, 3 Drawing Sheets

(56) References Cited

U.S. PATENT DOCUMENTS

2007/0181090 A1\* 8/2007 Jeanne ................ 123/195 C
2007/0234995 A1\* 10/2007 Jessberger ............ F02F 7/006
                                                     123/195 C
2008/0290609 A1\* 11/2008 Seibert ................ F16J 15/061
                                                     277/596

\* cited by examiner

COVER MOUNTING UNIT

BACKGROUND

1. Technical Field

The present invention relates to a cover assembly unit, in particular for the automobile sector. Such cover assembly units can be used for example as cylinder head covers, oil pan or transmission covers. The cover assembly unit comprises a particularly thin-walled cover pan, a gasket and two or more fastening screws.

2. Related Art

In particular in the automobile sector, there are many housing parts on the engine or transmission that are closed with various covers. These covers are for example cylinder head covers or oil pan gaskets, as these are used with engines or transmissions. In most systems on engines known to date it is usual that the oil pan is arranged positioned horizontally under the engine. This means that the oil pan and also the oil pan screws are easily accessible during all maintenance operations. This arrangement is also evident in principle with the usual transmission designs.

In the case of later transmission concepts, such as for example double clutch transmissions, the transmission oil pan can greatly deviate in its position from the horizontal. For this reason, the accessibility to the cover or to the screws can be substantially restricted in these cases.

If the covers consist of aluminium or even plastic and are designed as acoustically decoupled system it is usual to at least preassemble the acoustically decoupled connecting elements in the system and supply them with the cover as module. Gaskets that are usual today when using sheet-metal oil pans are carrier frame gaskets which consist of a metallic carrier frame with an elastomer sealing lip injection-moulded on at a face end.

In the case of acoustically decoupled cylinder head covers or even oil pans of plastic or cast aluminium it is usual that the screw-connection elements are preassembled. However, there are also systems of plastic which are not decoupled that include the preassembled screws.

With all these solutions, metal sleeves are generally in use in which the screws are captively fastened. In most cases, the system of sleeve and screw is inserted through the flange through an opening in the screw connection region and is fixed on the other side of the flange by a ring injection-moulded onto the gasket. In the case of the non-decoupled solutions, the sleeves for example with the captively fastened screw are directly pressed in or injection-moulded into the cover.

These solutions can be very well realised with appropriate flange thicknesses, as they are usual with cast aluminium, magnesium or injection-moulded plastic covers. These systems are usually equipped with pure elastomer gaskets without carrier frame, with which this solution can be easily realised.

Due to the design, other sealing systems are used in the case of sheet-metal covers. These are substantially carrier frame gaskets consisting of a metallic carrier with an injection-moulded on sealing system. Since a sheet-metal cover maximally has a flange thickness of approximately 1-2 mm, concepts as described above cannot be used here.

In the case of thin covers the flange thickness is not adequate in order to preassemble the screw-sleeve concepts. There is no possibility of fixing the screw elements of sleeve and screw as for instance with aluminium or plastic covers in the gasket, which is embodied as pure elastomer gasket.

A pure elastomer gasket requires a groove for fixing, as is usual with plastic or aluminium covers. Grooves cannot be produced with sheet-metal covers. For this reason, concepts other than carrier frame gaskets are employed here. In the case of plastic hoods, larger tolerances have to be offset as a rule which is why the gasket is substantially higher (e.g. 10-15 mm) and this already produces the installation space that is required so that the screw can slide back in the sleeve. This is comparable in the case of aluminium hoods. However, this does not apply to thin sheet-metal covers, here, the gasket thickness is for example only about 1.5 mm.

In the case of thin-walled covers, preassembled fastening screws would far protrude at their thread part and they are neither aligned in a stable manner in their screw connection line. Protruding screws however would force tightening all screws substantially at the same time. In the case of cramped assembly conditions, this is not possible as a rule.

The threads in the component to be sealed must not be damaged during the assembly. Slanting screws however could damage the threads on screwing-in. An accurate alignment of the screw axis is therefore necessary. However, in the case of conventional thin-walled covers such a fixing of the screw axis is not possible.

In the case of the sheet-metal hoods, which are mainly in use in the transmission sector, there is no known solution at the present time that can assume the object described in the following.

SUMMARY

An assembly unit, for example a transmission oil pan with gasket including screw connection system, is provided which covers the following requirements:

The cover is embodied as thin-walled pan, in particular as sheet-metal pan. The sealing concept is based on a carrier frame gasket. The fastening screws are preassembled and captively connected to the pan. The screw connection positions in each case are exactly fixed, since the screws as a rule are not accessible or not sufficiently easily so. With respect to the screw connection axis, the screws are securely positioned, i.e. the respective screw must not tilt or slant. The screws are securely positioned in the height. In order to guarantee a sound and secure assembly with which the threads in the component to be sealed are not damaged and the screws can be individually tightened, the screws when positioning the cover must not protrude further than necessary for the centring in the thread holes in the flange.

A cover assembly unit is thus provided, comprising,
  a thin-walled cover pan with
    a sealing flange;
    at least two screw holes in the sealing flange;
    at least one fixing opening; and
    a fastening screw captively arranged in each screw hole;
and
  a carrier frame gasket with
    a carrier;
    a gasket which bears against the sealing flange;
    a screw passage for each screw hole;
    a fixing element for each fixing opening; and
    a centering body for the fastening screw in each screw passage.

A new type of screw connection system is provided, which has the following main elements, which in turn comprise further individual elements, which joint into a system or an assembly unit assume the solution of the object:

thin-walled cover pan with captively fastened screws and fixing opening carrier frame gasket with fixing element and centering body for the screws.

Through fixing opening and associated fixing element the cover pan and the carrier frame gasket are captively connected to each other in the correct position. Through the centring bodies, the fastening screws are held in correct alignment. Here, the fastening screws can preferably be aligned in axial direction.

According to an embodiment, the at least one fixing element engages in the respective fixing opening in an engaging manner.

This can be achieved for example through a bead-like thickened part of the fixing elements, wherein the thickened part has at least a slightly larger width than the fixing opening at the relevant point. On joining cover pan and carrier frame gasket, such a fixing element is pressed through the fixing opening so that the thickened part holds both together in an engaging manner. In order to facilitate pressing-in the fixing element the latter can be embodied tapered or pointed in front of the thickened part.

According to an embodiment, a thickened part is formed in the shank of the fastening screws, which forms a captivity device.

With a simplified solution, the screw can thus be directly fastened in the pan and the gasket assumes the guidance. Here, the screw for example has a collar that is pushed through an undercut on the fastening bore or the screw hole of the sheet-metal pan. Because of this, the screw is captively fastened to the pan.

According to an embodiment, the cover pan furthermore comprises a bush arranged in each screw hole; wherein the fastening screws are each arranged in the bush.

According to an embodiment a captivity device is formed in the bushes.

This captivity device can be provided alternatively or in addition to the captivity device between screw and screw hole mentioned above.

According to an embodiment, the bush consists of a metallic material.

The bush is preferably of a metallic material in order to be able to transmit the necessary screw connection forces.

According to an embodiment, the bush is connected to the cover pan by means of a clamped connection, glued connection or welded connection.

The bush with the captive screw used can for example be connected to the sheet-metal pan through a clamped connection, be glued on or also directly welded on.

According to an embodiment, the cover pan consists of a metallic material.

According to an embodiment, the gasket consists of an elastomer material.

According to an embodiment, the centring body consists of an elastomer material.

In this embodiment, elastomer centring bodies are injection-moulded onto the gasket in the region in which the screws are located. These elastomer centring bodies assume the task of holding and guiding the screws exactly in the screw connection axis until the flange thread takes over the guidance during screwing-in. The injection moulding-on makes it possible to keep the number of operations and thus the manufacturing costs low.

According to an embodiment, the at least one fixing element consists of an elastomer material.

This embodiment makes it possible to mould on the fixing element directly with the moulding-on of the elastomer sealing lip of the carrier frame gasket, which reduces the number of operations and thus the manufacturing costs.

According to an embodiment, the fastening screws comprise an insertion aid at their thread end.

For example, the tip of the screw can be embodied tapered, cone-shaped or rounded-off in order to facilitate insertion in the associated threads.

According to an embodiment, the centring bodies are designed so that they guide and/or retain the respective fastening screw in a clamping manner.

Depending on design, these centring bodies can assume a pure guiding task without clamping or, depending on design, build up minor to stronger clamping forces which fix the screw in its position also in axial direction. Because of this, each screw can be set to the desired axial position. This can perhaps have major advantages during manual assembly in the event of a repair. In the event of a repair, the accessibility is mostly rendered substantially more difficult compared to the initial assembly, during which the cover is possibly assembled even before the transmission assembly.

The embodiment of the centring bodies can be effected variously, for example as a circumferential ring, as elements designed wave-shaped in top view or comprise a plurality of tapering elements facing to the inside.

According to an embodiment, the thickness of the cover pan is at least 0.3-0.5 mm. According to another embodiment, the thickness of the cover pan is a maximum of approximately 1-2 mm. These maximum or minimal values can be combined with one another. The term "thin-walled" must therefore be understood in the context of the invention as a thickness down to 0.3-0.5 mm and not substantially over and beyond 1-2 mm.

According to an embodiment, the fixing opening is embodied as continuous or as blind hole.

BRIEF DESCRIPTION OF THE DRAWINGS

In the following, exemplary embodiments are explained in more detail with reference to the Figures, in which.

DETAILED DESCRIPTION

Figure 1:
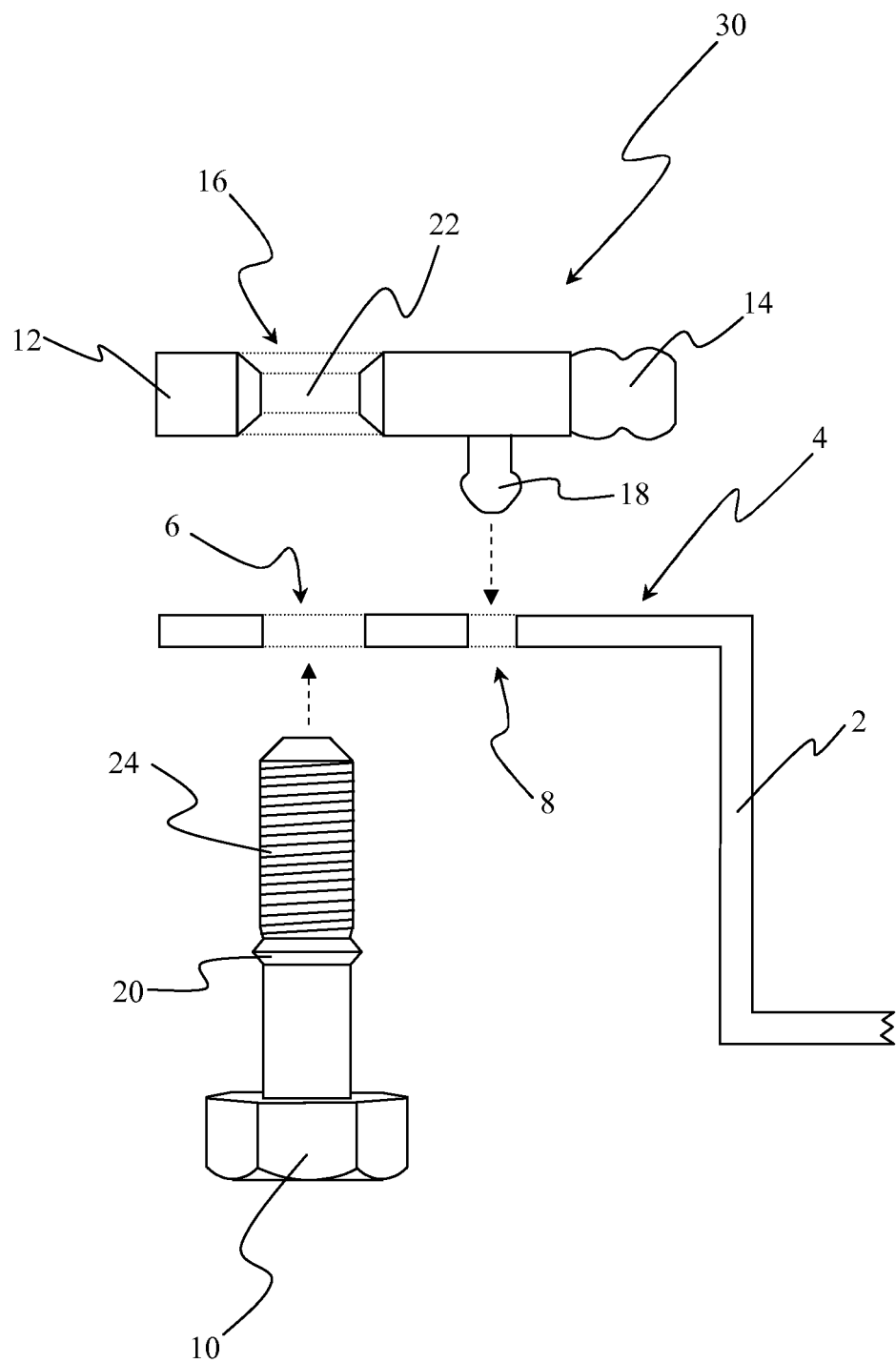
FIG. 1 shows elements of the assembly unit in cross section in the not yet preassembled state.

In FIG. 1, elements of an assembly unit are shown in cross section, in the state before the preassembly takes place. The medium side, i.e. for example engine or gear oil when using the cover as oil pan, is located on the right in this Figure.

A thin-walled cover pan 2 comprises at least two screw holes 6 (only one is shown here), and at least one fixing opening 8. The fixing opening 8 in this case is shown as a continuous hole, but can also be a blind hole in alternative embodiments. The cover pan 2 comprises a sealing flange 4.

A carrier frame gasket 30 comprises a carrier frame 12 and a gasket 14 for sealing on the sealing flange 4 of the cover pan 2. The carrier frame gasket 30 comprises a screw passage 16 (only one is shown here) for each screw hole of the cover pan 2. In the screw passage 16, a centring body is arranged. The carrier frame gasket 30 furthermore comprises a fixing element 18 for each fixing opening 8 in the cover pan 2.

In this embodiment, no bush for the screws (only one is shown here) is provided. The screw 10 has a thread 24 and a thickened collar 20. The collar 20 is thicker in the circumference than the diameter of the corresponding screw hole 6. For preassembly of the cover assembly unit, the carrier frame gasket 30 is placed against the cover pan 2, wherein the fixing element 18 is pushed through the fixing opening 8. In the embodiment shown, it is achieved through a corresponding configuration of the fixing element 18, that the latter engages in the fixing opening 8 in an engaging manner. Cover pan 2 and carrier frame gasket 30 are thus captively fastened to each other. The screw 10 is inserted in the corresponding screw hole 6 and the associated screw passage 16, wherein the collar 20 is at least pushed through the screw hole opening.

Figure 2:
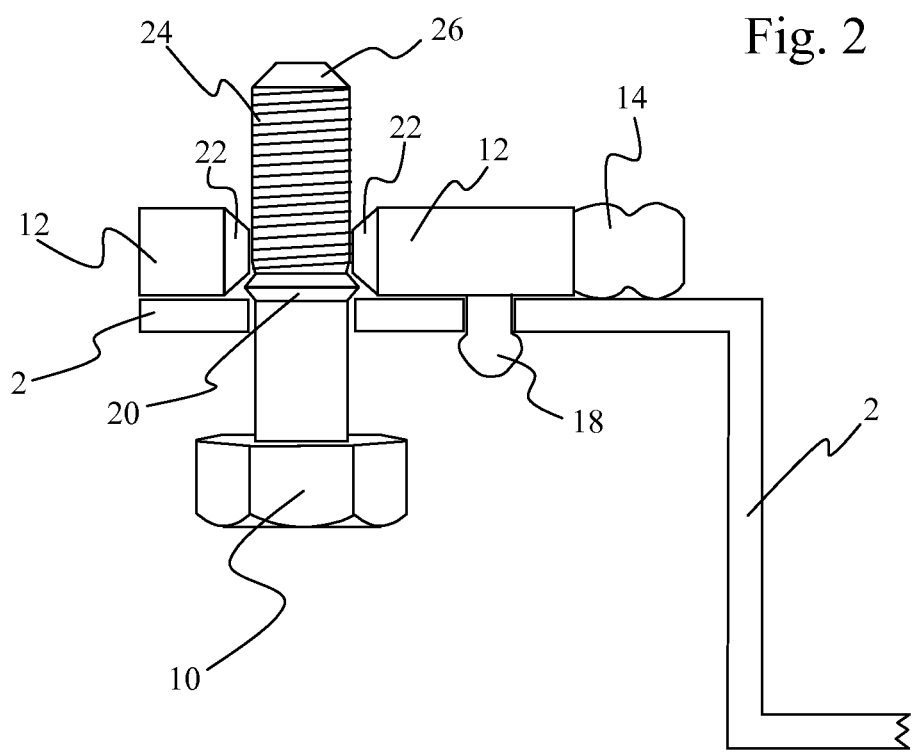
FIG. 2 shows the assembly unit of FIG. 1 in the preassembled state.

FIG. 2 shows the embodiment of FIG. 1 in the preassembled state. Here, the screw 10 is held captively in the screw hole 6 through the collar 20 that is thicker in the circumference. In order to hold the screw 10 in the correct position for screwing into the component to be sealed later on, it is retained by the centering body 20 in a guiding and/or clamping manner.

Figure 3:
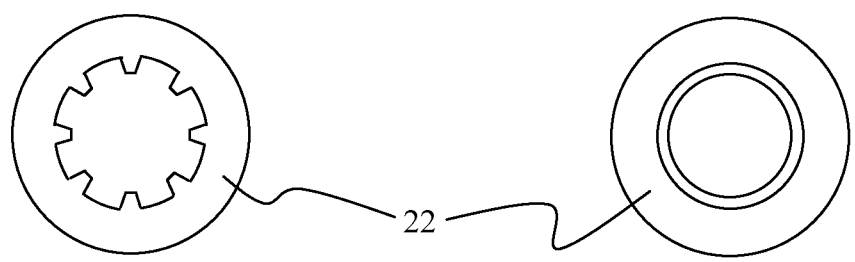
FIG. 3 shows different embodiments of centring bodies.

Cover pan 2 and carrier frame gasket 30 are fastened to each other through the fixing element 18 engaging in the fixing opening 8 in an engaging manner. Through the thickened part of the fixing element 18 that is present with this embodiment, which following pressing-in engages behind the cover pan 2 seen from the carrier frame gasket 30, a captivity device is achieved. The gasket 14 bears against the sealing flange of the cover pan 2 in a sealing manner. FIG. 3 shows two exemplary embodiments of centering bodies 22 in top view. These can be formed with a plurality of tapering elements facing to the inside (left side of the Figure), or with a triangular or trapezium-like cross-sectional shape (as shown in FIGS. 1 and 2). Another alternative which is not shown are internal edges which are wave-shaped seen from the top. Depending on the configuration of the centering bodies 22 it is achieved that the screw located therein is at least guided or also held in a clamping manner to a greater or lesser degree. An axial displaceability of the screw is preferred in this case in order to facilitate the assembly. However, this should not be so easily moveable that the screw axially displaces itself spontaneously. Furthermore, a tilting of the screw should preferably be prevented.

Figure 4:
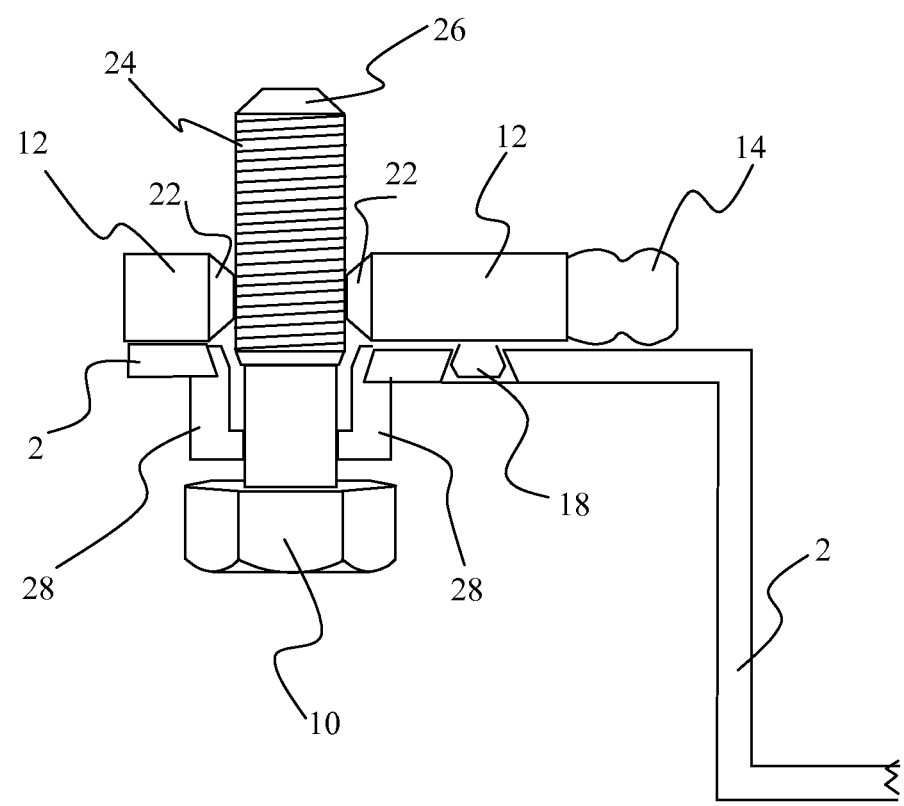
FIG. 4 shows a second embodiment of the assembly unit in cross section.

FIG. 4 shows an alternative embodiment of the cover assembly unit in cross section, with substantially the same elements as that of FIG. 1. However, with this embodiment a bush 28 is arranged in the screw hole, in which the screw 10 is captively arranged. This can be achieved for example in that the screw 10 has a thread 24 with a larger circumference than the screw opening of the bush 28. The screw 10 in this embodiment has no thickened collar 20.

An advantage of this embodiment lies in that through the bush 28 a relatively large adjusting range of the screw 10 is achieved, although the cover pan 2 (compared to the screw length) is comparatively thin-walled.

A further difference lies in the configuration of fixing opening and fixing element 18. The fixing opening in this case is embodied as non-continuous blind hole. Engaging behind of the fixing element 18 is therefore not possible. In order to achieve the captivity device, fixing opening and fixing element 18 in this case are embodied substantially in the manner of a truncated cone, wherein the fixing element 18 for facilitating the pushing-in has a tapered tip.

The cover assembly unit offers the following advantages. A captively and preassembled screw is possible even when using a thin-walled sheet-metal cover. The preassembled gasket can be optimally positioned for the assembly. The screw is located in optimal assembly position by means of centering. The screw is optimally fixed in the screw connection axis through centering body and/or bush. A tilting of the screw is prevented. An axial displaceability of the screw is possible. It is possible to fix the screw and hold it slightly displaceably or generate a defined clamping force.

The invention claimed is:

1. A cover assembly unit, comprising:
   a thin-walled cover pan with
      a thin-walled sealing flange comprising a sealing region where a gasket should bear against the sealing flange of the cover pan;
      at least two screw holes in the sealing flange and located outside said sealing region;
      at least one fixing opening being a through hole located outside of said sealing region and being different from said screw holes; and
      a fastening screw captively arranged in each screw hole; and
   a carrier frame gasket, non-unitary to said thin-walled cover pan, with
      a carrier;
      a gasket bearing against the sealing flange and being attached to said carrier;
      a screw passage for each screw hole in said carrier;
      a fixing element for each fixing opening, each of said fixing elements being located on the carrier and being aside from said gasket, and wherein said fixing element is pushed through said fixing opening, projects out of said fixing opening, and engages the respective fixing opening with a form fit; and
      a centering body for the fastening screw in each screw passage.

2. The cover assembly unit according to claim 1, wherein a thickened part is formed in the shank of the fastening screws, which forms a captivity device.

3. The cover assembly unit according to claim 1, wherein the cover pan furthermore comprises:
   a bush arranged in each screw hole; and
   wherein the fastening screws are each arranged in the bush.

4. The cover assembly unit according to claim 3, wherein a captivity device is formed in the bushes.

5. The cover assembly unit according to claim 3, wherein the bush consists of a metallic material.

6. The cover assembly unit according to claim 3, wherein the bush is connected to the cover pan by means of one of a clamped connection, glued connection or welded connection.

7. The cover assembly unit according to claim 1, wherein the cover pan is made of a metallic material.

8. The cover assembly unit according to claim 1, wherein the gasket is made of an elastomer material.

9. The cover assembly unit according to claim 1, wherein the centering bodies are made of an elastomer material.

10. The cover assembly unit according to claim 1, wherein the at least one fixing element is made of an elastomer material.

11. The cover assembly unit according to claim 1, wherein the fastening screws at their thread end comprise an insertion aid.

12. The cover assembly unit according to claim 1, wherein the centering bodies are so designed that they guide and/or retain in a clamping manner the respective fastening screw.

13. The cover assembly unit according to claim 1, wherein the thickness of the cover pan lies in the range from minimal approximately 0.3-0.5 mm and/or maximal approximately 1-2 mm.

14. The cover assembly unit according to claim 1, wherein the at least one through hole is embodied as one of a geometric cylinder and a geometric frustum.

* * * * *